United States Patent

Woo et al.

[11] Patent Number: 5,682,457
[45] Date of Patent: Oct. 28, 1997

[54] METHOD AND APPARATUS FOR RECORDING HDTV SIGNALS HAVING A WIDE BANDWIDTH ON A NARROW BANDWIDTH TAPE

[75] Inventors: Sang Joon Woo; Kook Hyun Jang; Tai Suk Yang, all of Seoul; Taik Sang Oh, Kyungki-Do, all of Rep. of Korea

[73] Assignee: Goldstar Co., Ltd., Seoul, Rep. of Korea

[21] Appl. No.: 400,510

[22] Filed: Mar. 7, 1995

Related U.S. Application Data

[63] Continuation of Ser. No. 17,262, Feb. 12, 1993, abandoned.

[30] Foreign Application Priority Data

Feb. 15, 1992 [KR] Rep. of Korea ............... 2273/1992
Sep. 9, 1992 [KR] Rep. of Korea ............... 16592/1992
Sep. 16, 1992 [KR] Rep. of Korea ............... 16847/1992

[51] Int. Cl.$^6$ ............................................. G11B 5/02
[52] U.S. Cl. ........................... 386/95; 386/109; 386/122; 360/22
[58] Field of Search ........................... 360/48, 22, 14.1, 360/14.2, 32, 53, 64; 386/46, 122, 123, 131, 36, 37, 40, 95, 109, 113, 124, 52, 57

[56] References Cited

U.S. PATENT DOCUMENTS

| | | | |
|---|---|---|---|
| 4,437,128 | 3/1984 | Sapkowski | 360/22 X |
| 4,734,901 | 3/1988 | Murakami | 360/48 |
| 4,764,820 | 8/1988 | Takeshita et al. | 360/22 |
| 4,785,358 | 11/1988 | Ninomiya | 360/22 |
| 4,812,920 | 3/1989 | Nagashima | 386/122 X |
| 5,068,752 | 11/1991 | Tanaka et al. | 360/32 |
| 5,130,859 | 7/1992 | Seki et al. | 360/14.2 |
| 5,191,437 | 3/1993 | Kim | 360/22 |

*Primary Examiner*—Aristotelis M. Psitos
*Assistant Examiner*—Larry T. Cullen

[57] ABSTRACT

A method of, and an apparatus for, the two-channel recording/playing back of signals in a VCR, wherein video data is divided into a signal with two channels to be recorded, so that HDTV signals can be recorded on a general S-VHS tape and played back therefrom. The apparatus includes: record system means for interleaving inputted data to divide it into two channels by adding dummy blocks and synchronizing blocks to the data at intervals of every two frames so as to record the data in two channels; playback system means for detecting data; and, synchronizing signal means for removing the dummy blocks and synchronizing blocks, based on the synchronizing signal, so as to format the data; means for combining and de-interleaving data of the two channels, and means for error-correcting and decoding the two channels.

10 Claims, 9 Drawing Sheets

METHOD AND APPARATUS FOR RECORDING HDTV SIGNALS HAVING A WIDE BANDWIDTH ON A NARROW BANDWIDTH TAPE

This application is a continuation of application Ser. No. 08/017,262 filed on Feb. 12, 1993, now abandoned.

BACKGROUND OF THE INVENTION

1. Field of the Invention

The present invention relates to record/playback in video cassette recorders, and more particularly to a method of and an apparatus for two-channel recording/playing back of signals in a digital video cassette recorder, wherein a HDTV signal is divided into two channels upon recording and then subjected to a channel combination treatment upon playing back, thereby enabling a general video tape to be used for record/playback of HDTV signals with a high data rate.

2. Description of the Prior Art

Referring to FIG. 1, there is illustrated a conventional record/playback apparatus for a video cassette recorder (VCR). As shown in FIG. 1, the apparatus comprises a record system and a playback system. The record system includes an error correction and encoding unit 2 for error-correcting a digital video signal received via an interface unit 1, an interleave unit 3 for interleaving with the error-corrected video signal an output signal from the error-correction and encoding unit 2, a modulation unit 4 for modulating an output signal from the interleave unit 3 into a signal proper to be recorded on a video tape via a record-playback head unit 6, and a record amplification unit 5 for amplifying an output signal from the modulation unit 4.

On the other hand, the playback system includes a playback amplification unit 7 for amplifying a played-back signal detected from the video tape via the record/playback head 6 to a proper level, a data detection unit 8 for detecting data from an output from the playback amplification unit 7, a synchronous detection unit 9 for detecting a synchronizing signal from an output signal from the data detection unit 8, a demodulation unit 10 for demodulating the data, based on the synchronizing signal detected by the synchronous detection unit 9, a de-interleave unit 11 for de-interleaving an output signal from the demodulation unit 10, and an error-correction and decoding unit 12 for correcting errors of an output signal from the de-interleave unit 11, decoding the error-corrected signal into a digital video signal and then outputting it via the interface unit 13.

Now, operation of the conventional record/playback apparatus with the above-mentioned construction will be described.

First, as video data is inputted via the interface unit 1 in a record mode of the VCR, the error-correction and encoding unit 2 corrects errors generated during a data transfer and encodes the video data into proper codes.

Thereafter, the video data is added with a synchronizing pattern and identification data in the interleave unit 3, so as to carry out an interleave for properly varying the order of data. Then, the data is modulated into a signal meeting a record frequency and amplified by the modulation unit 4 and the record amplification unit 5. The amplified signal is then recorded on a video tape.

On the other hand, in a playback mode of the VCR, a played-back signal from the video tape detected by the record/playback head unit 6 is amplified in the playback amplification unit 7 and then inputted at the data detection unit 8. In the data detection unit 8, an equalizing, a clock recovery and a data detection are carried out. The synchronous detection unit 9 detects the synchronizing pattern and thus detects the synchronizing signals. The signal is then demodulated by the demodulation unit 10. After the demodulation, the data which was interleaved upon recording is recovered in the de-interleave unit 11, according to the original data order. The recovered data is error-corrected in the error-correction and decoding unit 12, to remove errors generated upon playing back. Also, the data is decoded into an original digital video signal which is then outputted via the interface unit 13.

In the conventional record/playback apparatus of a digital VCR, however, the data should be added with a separate synchronizing pattern in addition to the synchronizing pattern included in each horizontal synchronizing block of the original signal, as well as identification data ID for correctly designating the position of each horizontal synchronizing block. As a result, the quantity of data is increased due to such additions of a separate synchronizing pattern and identification data, thereby requiring a high density recording technique. In particular, the synchronous detection unit 9 of the playback system should detect the identification data ID and designate the position of each synchronizing block, based on the detected identification data. As a result, its circuit is complicated.

Generally, a TV signal in the NTSC system has 525 horizontal lines per frame. Where such a TV signal is recorded on a video tape in the form of digital data, horizontal synchronizing blocks are generated for recording separately data of one horizontal synchronizing block on two tracks. As a result, data portions with synchronizing patterns which are not detected upon playing-back occur, thereby causing errors to be generated.

Upon a head switching carried out at the start portion and end portion of each track, a possibility of generating errors is high. The errors at a high rate adversely affect the picture quality. This is because in digital VCRs, data recorded on the start portion and end portion of each track do not correspond to signals at the upper end and lower end of a frame, in that the data recording is carried out in an interleaving manner.

In the VHS system, the frequency of a video signal has a band width of up to 4.4 MHz, as shown in FIG. 2A. In the S-VHS system, the frequency of a video signal has a bandwidth of up to 7.0 MHz, as shown in FIG. 2B. Accordingly, video tapes capable of recording video signals with a bandwidth of up to 7.0 MHz are used as general video tapes.

Although the above-mentioned general vide tapes can record video signals with a bandwidth of up to 7.0 MHz without any difficulty, HDTV signals which have a high data rate as compared with those of the S-VHS system can not be recorded on general VHS tapes or S-VHS tapes. For recording such HDTV signals, ME-tapes or MP(8 mm or Hi 8 mm) tapes are used which can record a bandwidth of up to about 12 MHz.

However, these ME-tapes, Hi 8 mm MP-tapes and 8 mm MP tapes are expensive.

SUMMARY OF THE INVENTION

Therefore, an object of the invention is to provide a method of, and an apparatus for, two-channel recording/playing back of signals in a VCR, wherein video data is divided into a signal with two channels to be recorded, so that HDTV signals can be recorded on a general S-VHS tape and played back 5 therefrom.

Another object of the invention is to provide a method of, and an apparatus for, two-channel recording/playing back signals in a VCR, wherein dummy blocks in predetermined number are added to the start position and end position of each track, so that generation of errors upon head switching is prevented.

Another object of the invention is to provide a method of, and an apparatus for, two-channel recording/playing back signals in a VCR, wherein an addition of synchronizing blocks in a predetermined number is achieved at intervals of two frames so that the number of horizontal synchronizing blocks per track is constant, thereby eliminating a problem that data of one horizontal synchronizing block is recorded on different tracks, and thus correctly finding the position of each horizontal block without adding any separate synchronizing pattern and identification data.

In accordance with one aspect of the invention, the present invention provides a method for two-channel recording/playing back of signals in a digital video cassette recorder, comprising the steps of: recording data on a video tape in two channels, the recording step including the steps of interleaving data inputted, dividing the interleaved data into two channels by selecting them alternatingly, record formatting the data by adding dummy blocks and synchronizing blocks to the data by channels at intervals of two frames so as to make the number of blocks per track constant; and playing back the data recorded on the video tape separately in two channels, the playing-back step including the steps of demodulating two-channel data detected from the video tape upon playing-back, formatting the two-channel data by removing the dummy blocks and synchronizing blocks added upon recording, combining the formatted two-channel data and de-interleaving the combined data.

In accordance with another aspect of the invention, the present invention provides an apparatus for two-channel recording/playing back of signals in a digital video cassette recorder, comprising: interleave and channel division means for interleaving input video data and dividing the data into two channels; record formatter means for formatting the data by channels so as to make the number of blocks per track constant, by adding, to each channel data, dummy blocks and synchronizing blocks predetermined by the unit of two frames; modulation means for modulating output data from the record formatter means by channels, record amplification means for amplifying an output signal from the modulation means and outputting it at record/playback head means, by channels; playback formatter means for formatting played-back data, by channels, by removing from a signal detected from a video tape and demodulated, the dummy blocks and synchronizing blocks added to each channel data upon recording; de-interleave and channel combination means for de-interleaving two-channel data from the playback formatter means and combining the two-channel data; and error-correction and decoding means for error correcting output data from the de-interleave and channel combination means, decoding it into digital video data and outputting it.

Upon recording, input data is divided into two channels in the interleave and channel division means and then added with the dummy blocks and synchronizing blocks in the record formatter means, so as to be recorded on the video tape. Upon playing-back, the data is demodulated by channels. Thereafter, the dummy blocks and synchronizing blocks are removed from the data in the playback-formatter means. The data free of the blocks are combined together in the de-interleave and channel combination means, so as to be played back.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

The two-channel record-playback method for a digital VCR comprises recording data on a video tape in two channels and playing back the data recorded on the video tape separately in two channels. The recording step includes the steps of interleaving data inputted, dividing the interleaved data into two channels by selecting them alternately, record-formatting the data by adding dummy blocks and synchronizing blocks to the data by channels at intervals of every two frames so as to make the number of blocks per track constant. The playing-back step includes the steps of demodulating two-channel data detected from the video tape, formatting the two-channel data by removing the dummy blocks and synchronizing blocks added upon recording, combining the formatted two-channel data, and de-interleaving the combined data.

The record-formatting step comprises the steps of: adding dummy blocks of predetermined lines to a start position and an end position of each track at which a head switching is carried out by a memory initialization; adding synchronizing blocks by channels, at intervals of every two frames, at a position next to the dummy block positioned at the start position of each interval according to respective mounting angles of the video heads for the channels by determining the number of lines so as to make the number of horizontal synchronizing blocks per track constant; and recording input data between each synchronizing block and the dummy block positioned at the end position of each track or between the dummy blocks positioned at the start and end positions of each track.

Reading of the record-formatted data is carried out at a clock rate faster than the clock rate upon writing, by the quantity of added dummy blocks and synchronizing blocks. The data formatting step for each of the horizontal synchroniziny blocks constituting each of the blocks is carried out without addition of additional synchronizing patterns and identification data.

Figure 1:
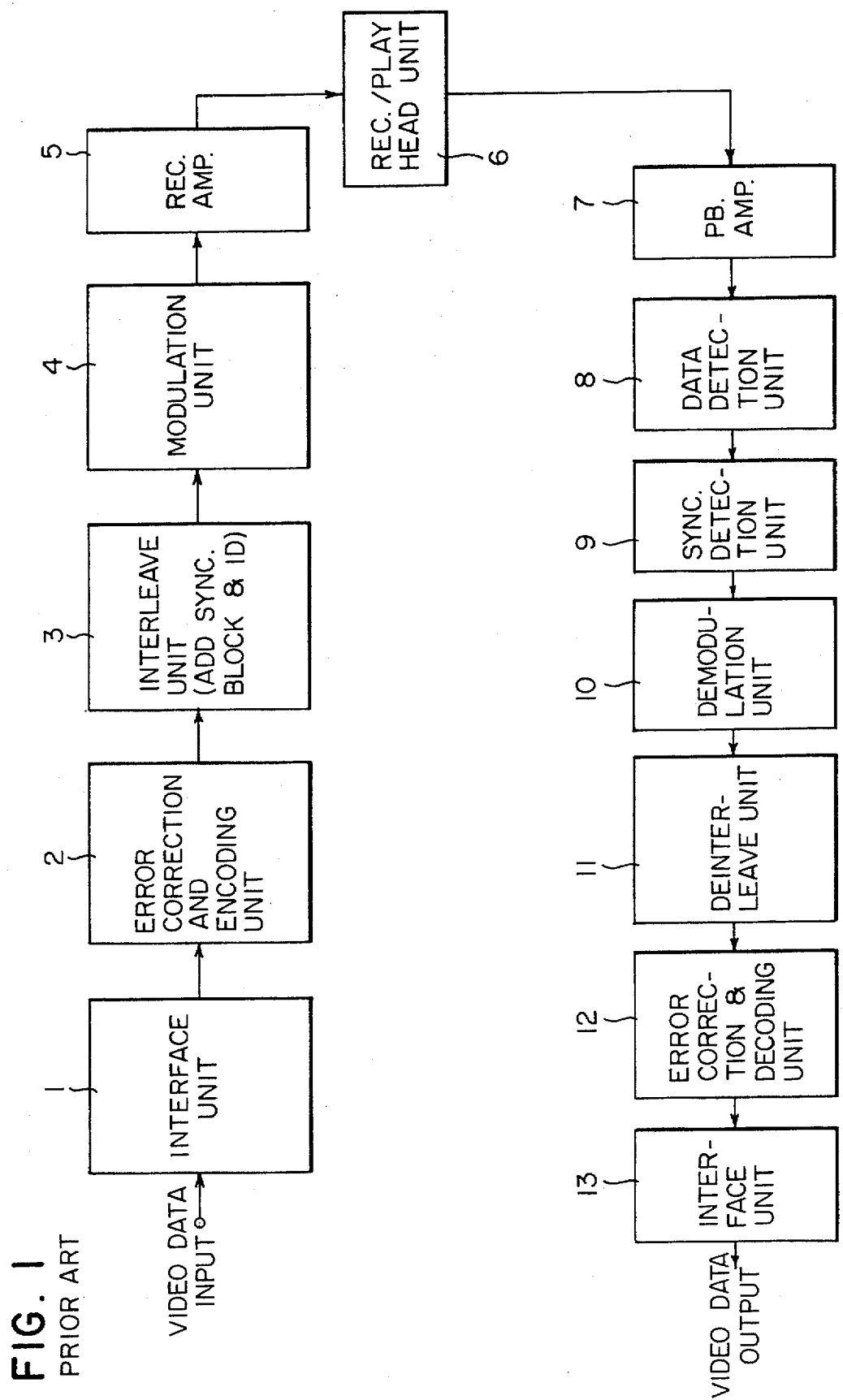
FIG. 1 is a block diagram of a conventional record/playback apparatus for a digital VCR.
Figure 2A:
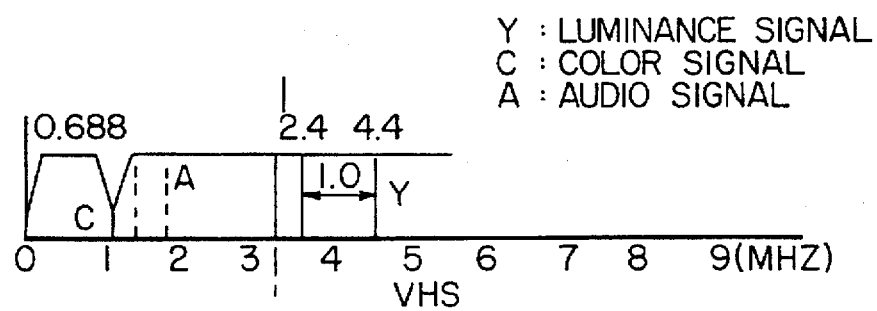
FIGS. 2A and 2B are frequency characteristic curves of signals in general VHS and S-VHS systems, respectively.
Figure 2B:
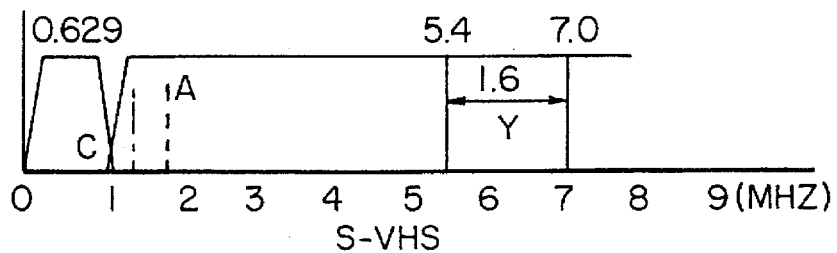
Figure 2C:
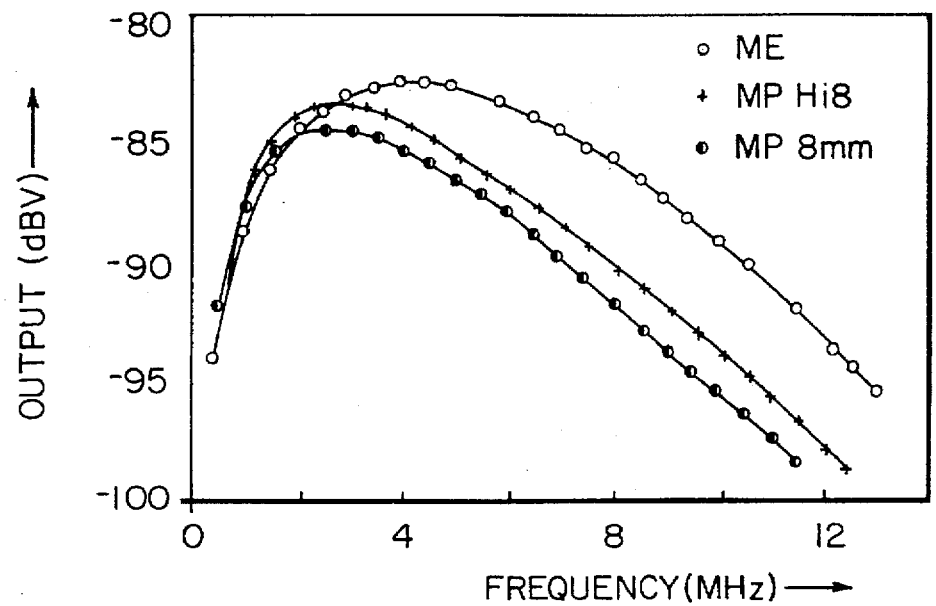
FIG. 2C is a recording frequency characteristic curve of ME-tape and MP-tape.
Figure 3:
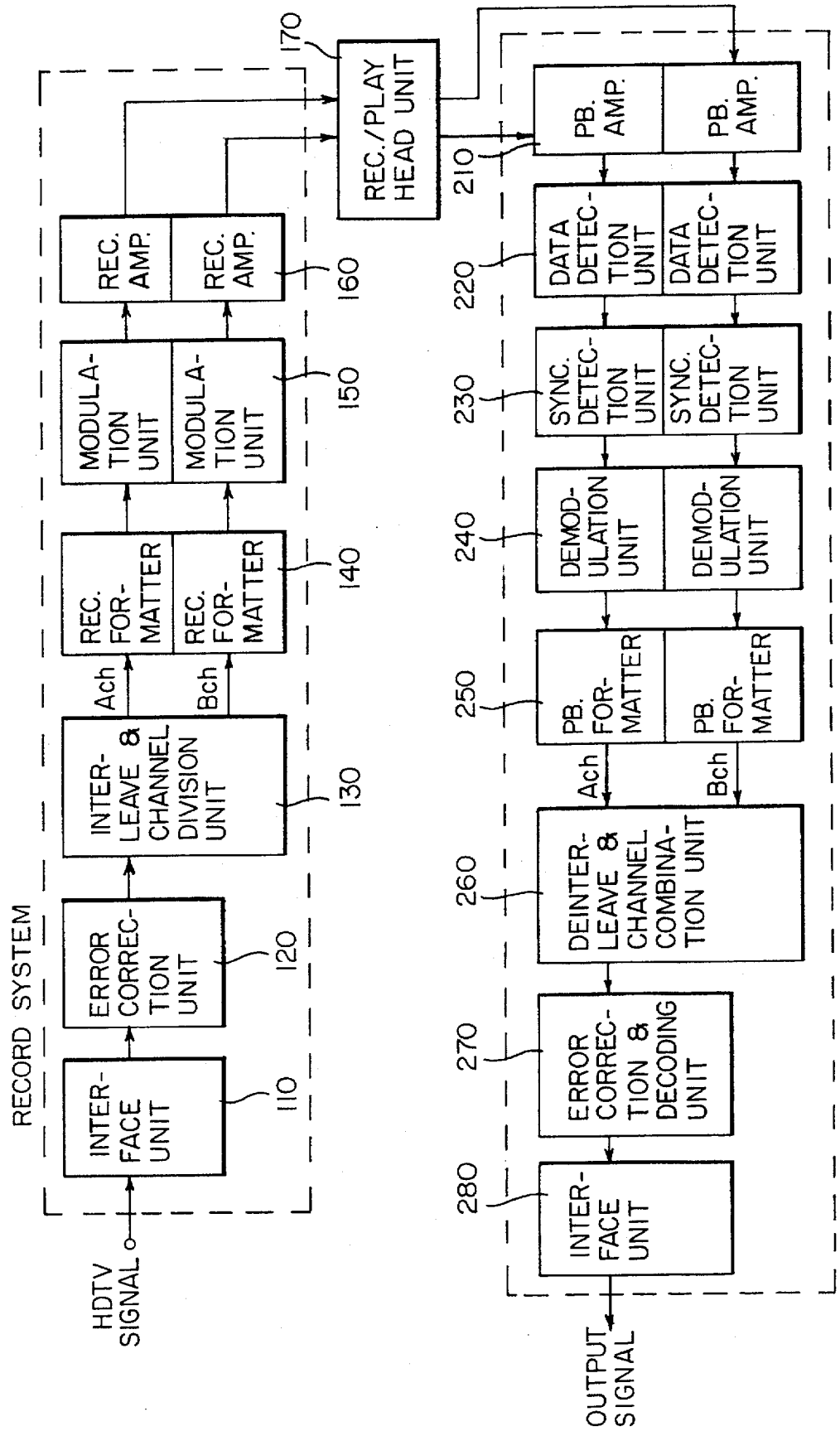
FIG. 3 is a block diagram of a record/playback apparatus for a digital VCR in accordance with the present invention.

On the other hand, an apparatus for accomplishing the two-channel record/playback method is illustrated in FIG. 3. The apparatus comprises a record system for interleaving an inputted data by adding dummy blocks and synchronizing blocks to the data at intervals of every two-frames so as to record the data in every two-channels. The apparatus also comprises: a playback system for detecting data of each channel and a synchronizing signal from a played-back signal; removing the dummy block and synchronizing block, based on the synchronizing signal, so as to format the played-back data; combining and de-interleaving data of two channels; and then error-correcting and decoding them.

The recording system includes: an error-correction and encoding unit 120 for correcting errors of a digital video signal inputted via an interface 110; an interleave and channel division unit 130 for interleaving an output signal from the error-correction and encoding unit 120 and dividing the data into two channels; a record formatter unit 140 (140a and 140b) for formatting the data by channels so as to make the number of blocks per track constant, by adding, to each channel data, dummy blocks and synchronizing blocks predetermined by the unit of two frames; a modulation unit 150 (150a and 150b) for modulating output data from the record formatter unit 140 by channels; and a record amplification unit 160 (160a and 160b) for amplifying an output signal from the modulation unit 150 and outputting it at the record/playback head unit 170, by channels.

The playback system includes: a playback amplification unit 210 (210a and 210b) for receiving played-back signals from a video tape detected by the record/playback head unit 170, by channels, and amplifying them to a proper level; a data detection unit 220 (220a and 220b) for detecting data from an output signal from the playback amplification unit 210, by channels; a synchronous detection unit 230 (230a and 230b) for detecting a synchronizing signal from an output signal from the data detection unit 220; a demodulation unit 240 (240a and 240b) for demodulating the synchronizing signal-detected from the synchronous detection unit 230, by channels; a playback formatter unit 250 (250a and 250b) for formatting 1 played-back data by channels, by removing the dummy blocks and synchronizing blocks added to each channel data upon recording; a de-interleave and channel combination unit 260 for de-interleaving two-channel data from the playback formatter unit 250 and combining the two-channel data; and an error-correction and decoding unit 270 for error-correcting output data from the de-interleave and channel combination unit 260 decoding it into digital video data and outputting it via the interface unit 280.

Figure 4:
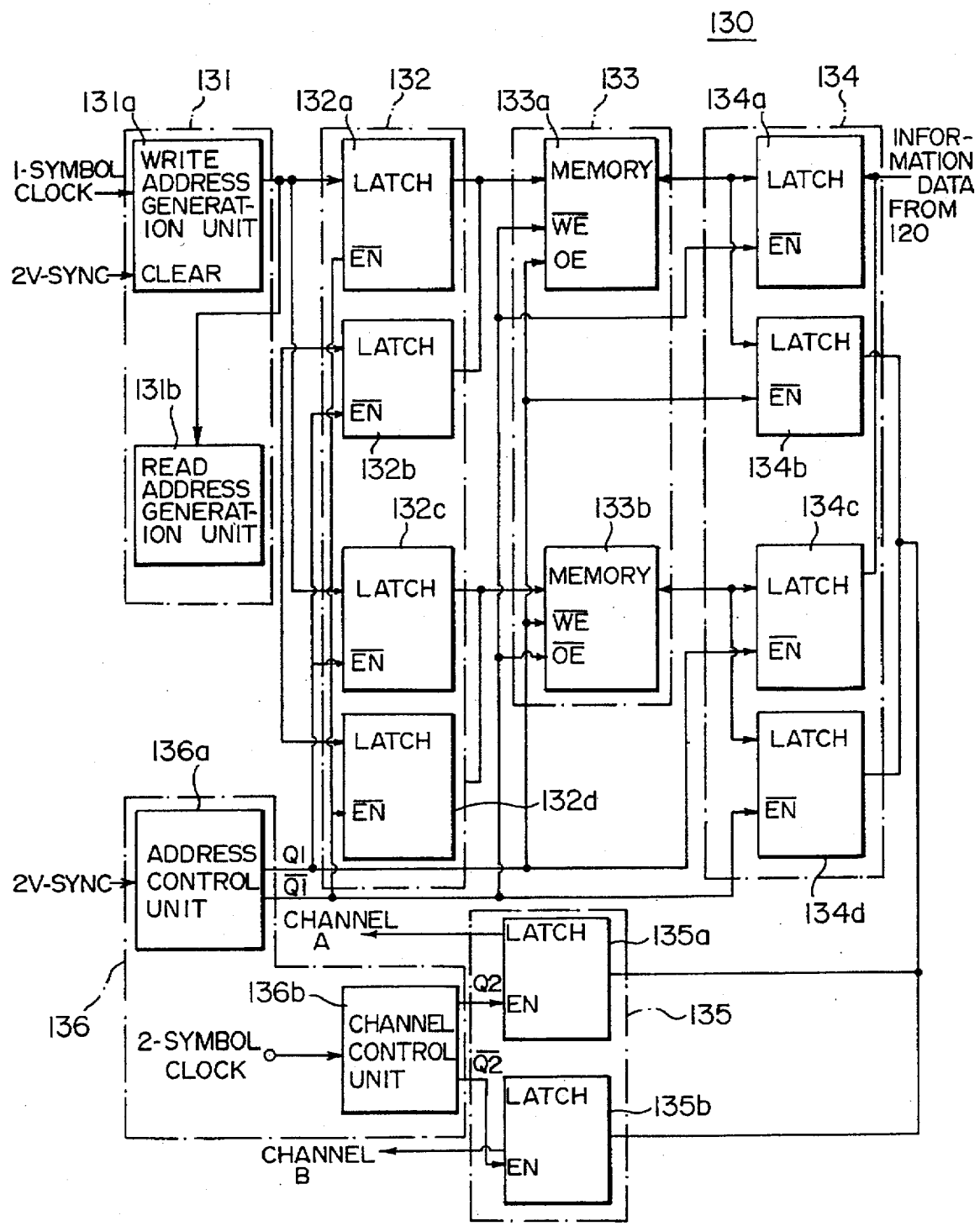
FIG. 4 is a block diagram of an interleave and channel division unit of FIG. 3.

As shown in FIG. 4, the interleave and channel division unit 130 of the record system comprises: a data storage circuit 133 including a pair of memories 133a and 133b for storing and outputting, alternately, data received by the unit of a symbol, at intervals of each frame; an address generation circuit 131 including a write address generator 131a for generating a write address for writing data horizontally on the memory circuit 133 based on a symbol clock signal, and a read address generator 131b for receiving the write address generated from the write address generator 131a as an address and generating the write address previously stored at intervals of two-vertical synchronizing signals so as to read vertically the data stored in the memory circuit 133; an address selection circuit 132 including two pairs of latches 132a, 132b, 132c and 132d for latching the write and read addresses, alternately, frame-by-frame and supplying the write and read addresses, alternately, to the memories 133a and 133b of the memory circuit 133; a data latch circuit 134 including a pair of latches 134a and 134a for latching, alternately, data received symbol-by-symbol and supplying them to the memories 133a and 133b as write data; and a pair of latches 134b and 134d for latching and outputting the data alternately outputted from the memories 133a and 133b of the memory circuit 133, respectively; a channel division circuit 135 including a pair of latches 135a and 135b for latching, alternately, data outputted from the memory circuit 133 through the data latch circuit 134, dividing them into data channels A and B; and a control circuit 136 including an address controller 136a for controlling the write and output operations of each memory of the memory circuit 133 and correspondingly controlling the address selection of the address selection circuit 132 and the enable state of each latch of the data latch circuit 134; and, a channel controller 136b for controlling the enable states of latches 135a and 135b of the channel division circuit 135, alternately, based on a two-symbol clock signal.

Figure 5:
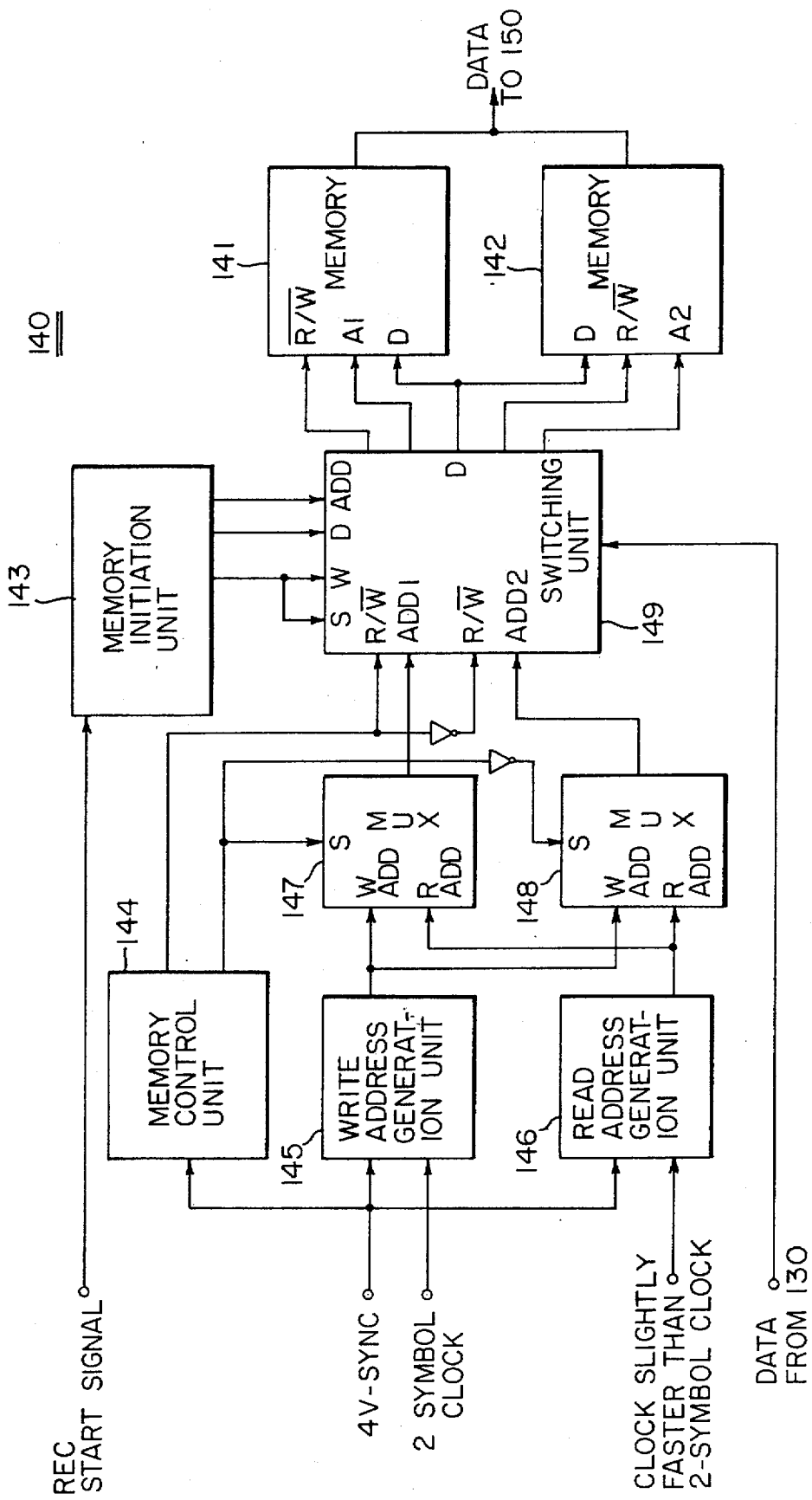
FIGS. 5 and 6 are block diagrams of a record formatter and a playback formatter of FIG. 3, respectively.

The record formatter unit 140 comprises a pair of record formatters 140a and 140b adapted to achieve the record formatting by channels. As shown in FIG. 5, each of record formatters 140a and 140b comprises: a memory initialization circuit 143 for outputting dummy data (to be recorded as data for each dummy block and each synchronizing block, the positions of which are predetermined on each track) and its address and write signals; a pair of memory circuits 141 and 142 for recording the dummy data outputted from the memory initialization circuit 143 at predetermined positions, so as to be respectively initialized, for receiving data, and for storing and outputting them alternately; a write address generation circuit 145 for recording information data on memory locations of the memory circuits 141 and 142, except for the dummy blocks and synchronizing blocks, at intervals of four vertical synchronizing signals, according to the two-symbol clock signal; a read address generation circuit 146 for generating read addresses for the memory circuit 141 and 142 at intervals of four vertical synchronizing signals according to a clock signal slightly faster than the two-symbol clock signal; a pair of multiplexors 147 and 148 for selecting the write and read addresses, alternately; a memory control circuit 144 for controlling write and read operations of the memory circuit 141 and 142, alternately, and for controlling the selection of the multiplexors 147 and 148; and a switching circuit 149 for supplying the write signal, address and dummy data from the memory initialization circuit 143 to the memory circuits 141 and 142 upon the memory initialization according to a write control signal from the memory initialization circuit 143 and for supplying a write/read selection signal from the memory control circuit 144, selected addresses from the multiplexors 147 and 148 and input data from the Interleave and channel division unit 130 to the memory circuits 141 and 142, after the memory initialization.

Figure 6:
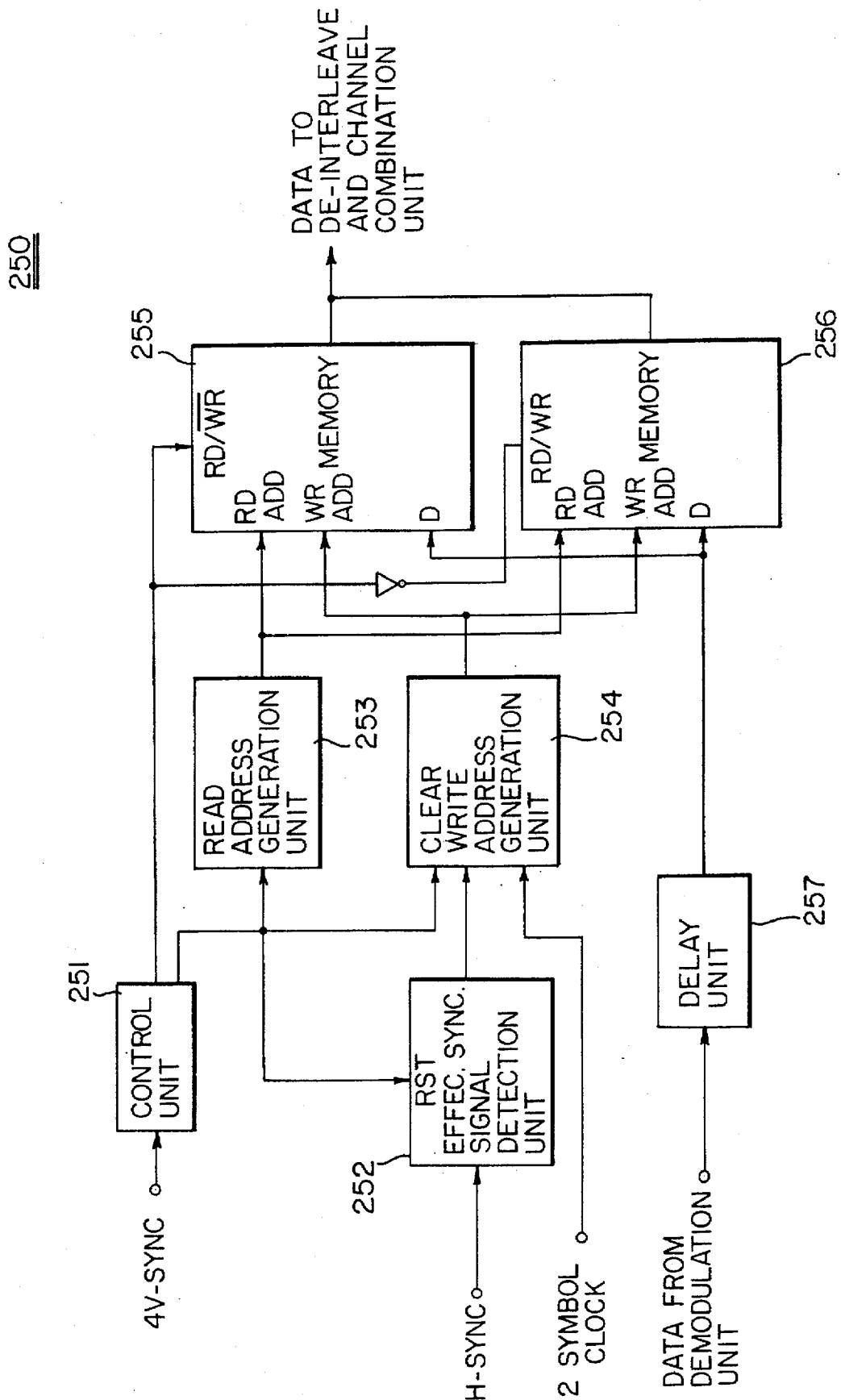

On the other hand, the playback formatter unit 250 of the playback system comprises a pair of playback formatters 250a and 250b adapted to achieve the playback formatting by channels. As shown in FIG. 6, each of playback formatters 250a and 250b comprises a pair of memory circuits 255 and 256 for recording and outputting data alternately, at intervals of every two frames; a control circuit 251 for controlling write and read operations of the memory circuits 255 and 256 alternately, at intervals of every four vertical synchronizing signals; an effective synchronizing signal detection circuit 252 for muting horizontal synchronizing signals corresponding to positions of the dummy blocks and synchronizing blocks added upon recording, at intervals of every four vertical synchronizing signals, and outputting the remaining horizontal synchronizing signals as effective synchronizing signals; a write address generation circuit 254 for generating write addresses for recording actual information data free of data about the dummy blocks and the synchronizing blocks, in the memory circuits 255 and 256, based on the effective synchronizing signals from the effective synchronizing signal detection circuit 252; a read address generation circuit 253 for generating read addresses for the memory circuits 255 and 256; and a data delay circuit 257 for delaying the input data to make the timing of the input data correspond to the timing of both the effective synchronizing signal detection circuit 252 and the write address generation circuit 254 and supplying the input data to the memory circuits 255 and 256 after the delay.

Figure 7:
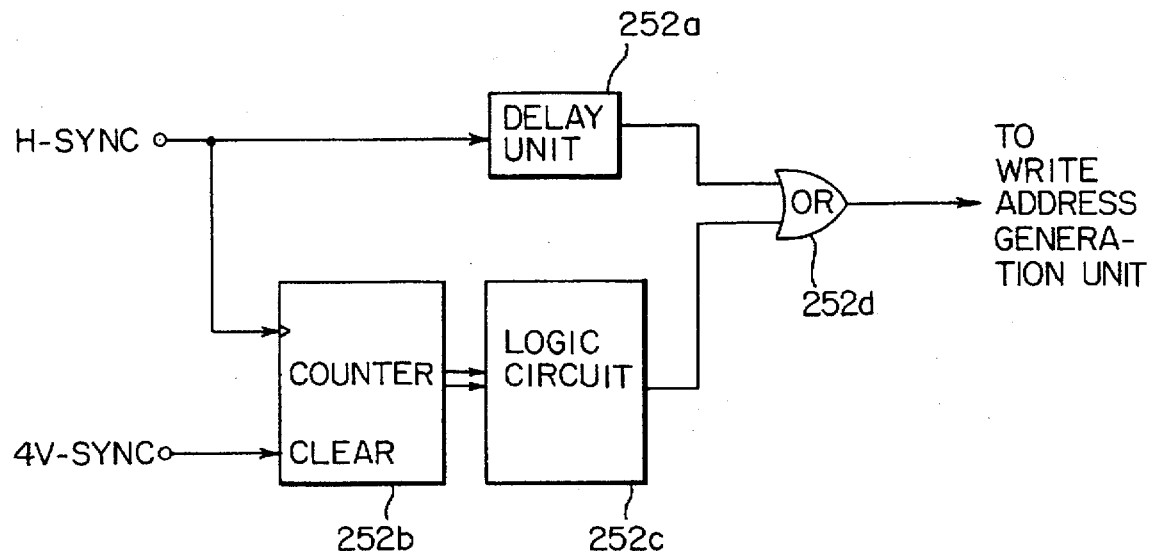
FIG. 7 is a block diagram of an effective synchronizing signal detection circuit of FIG. 6.

As shown in FIG. 7, the effective synchronizing signal detection circuit 252 comprises a counter 252b for counting horizontal synchronizing signals at intervals of every four vertical synchronizing signals; a logic circuit 252c for outputting a control signal for muting synchronizing signals when a counted value of the counter 252b corresponds to each position of the dummy blocks and synchronizing blocks; a delay 252a for delaying each inputted horizontal synchronizing signal so as to make the timing of an output signal from the logic circuit 252c correspond to the timing of the inputted horizontal synchronizing signal; and a logic gate 253d for ORing an output signal from the delay 252a and an output signal from the logic circuit 252c and outputting the resultant value as an effective synchronizing signal.

Figure 8:
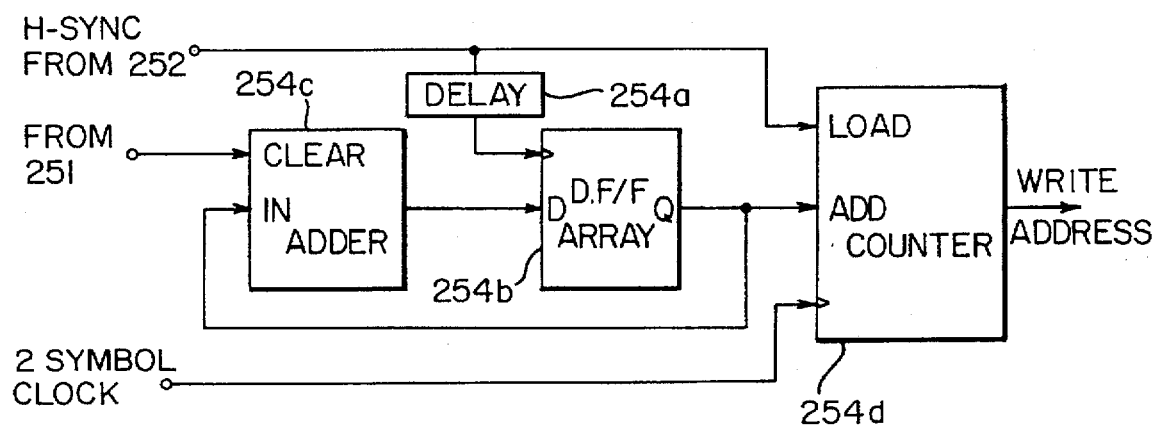
FIG. 8 is a block diagram of a write address generation circuit of FIG. 6.

As shown in FIG. 8, the write address generation circuit 254 comprises: a delay 254a for delaying the effective synchronizing signal from the effective synchronizing signal detection circuit 252; a flip-flop array 254b for outputting a data value loaded at its data input terminal upon every receipt of the effective synchronizing signal through the delay 254a; an adder 254c for adding a predetermined value, based on the number of data on one horizontal line, to the output data value from the flip-flop array 254b every time the output value varies and loading the resultant value on a data input terminal of the flip-flop array 254b; and a counter 254d for incrementing the counted value from the output data value from the flip-flop array 254b upon every receipt of the effective synchronizing signal and outputting the resultant value as a write address.

Next, operation of the two-channel record/playback apparatus with the above-mentioned arrangement according to the present invention will be described.

First, as a HDTV signal which was data-compressed during an operation in a record mode is inputted at the apparatus via the interface unit 110, it is error-corrected and encoded in the error-correction and encoding unit 120. In the interleave and channel division unit 130, the resultant data from the error-correction and encoding unit 120 are then arranged in a proper order and then selected alternately to be divided into two channels. Each channel of the two-channel-divided data is added with dummy blocks and synchronizing blocks are thus formatted. Thereafter, the formatted data are sent to the record/playback head unit 170 and recorded on a video tape.

The interleave and channel division unit 130 serves as follows.

First, the write address generator 131a generates a write address for writing input data horizontally on the memory circuit 133, based on a symbol clock signal. The read address generator 131b receives the write address from the write address generator 131a and generates a previously stored read address at intervals of every two vertical synchronizing signals, so as to read data from the memory circuit 133 vertically. At this time, the address control signal generator 136a of the control circuit 136 controls writing operations and outputting operations of memory 133a and 133b of the memory circuit 133 alternately, according to the two vertical synchronizing signals and correspondingly controls the address selection of the address selection circuit 132 and the enable state of each latch of the data latch circuit 134.

Figure 9:
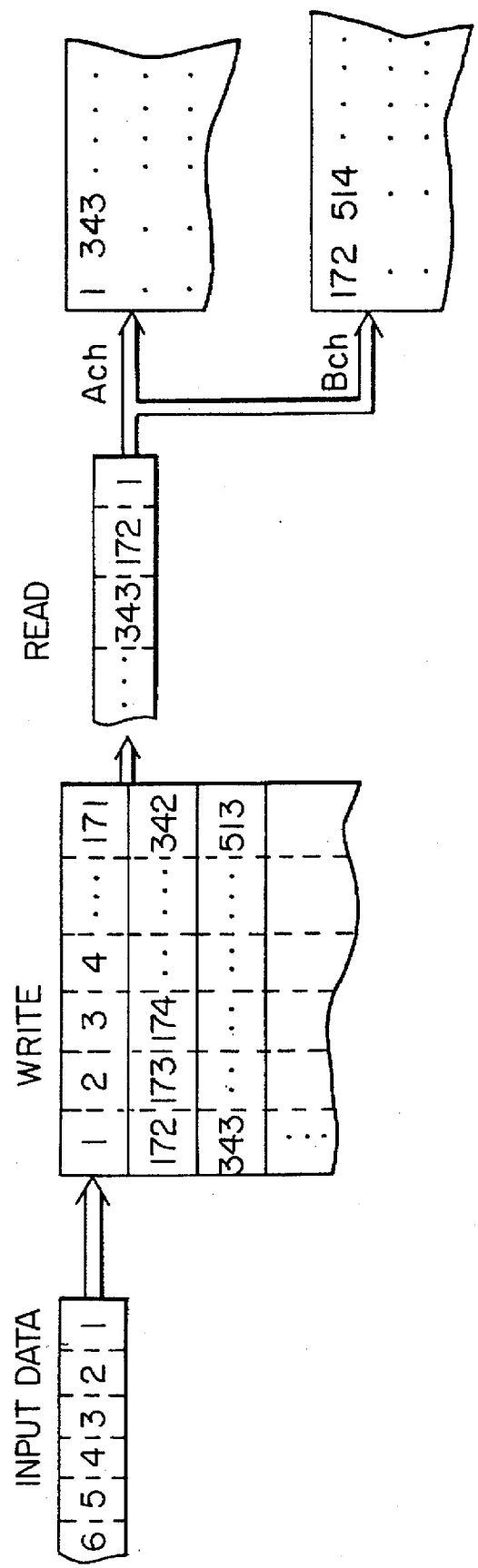
FIG. 9 is a schematic view explaining an interleave and a channel division according to the present invention.

For example, when control signals Q and/Q from the address controller 136a are high and low, respectively, the first memory 133a of the memory circuit 133 is at its write enable state while the second memory 133b is at its output enable state. On the other hand, the first and fourth latches 132a and 132d of the address selection circuit 132 are also at their enable state. The first and fourth latches 134a and 134d of the data latch circuit 134 are also their enable state. Accordingly, the first memory 133a receives a write address and data so that a write operation is carried out. Correspondingly, the second memory 133b receives a read address, so that the data previously written on the memory 133b is read and then outputted at the fourth latch 134d of the data latch circuit 134. That is, when symbol data are inputted in the order of 1, 2, 3, . . . , the write operation is carried out along horizontal lines and the read operation for the horizontal lines is carried out in a vertical direction. For example, the read operation is performed in the order of 1, 172, 343, . . . , as shown in FIG. 9.

Thereafter, the data interleaved as mentioned above are divided into two channels in the channel division circuit 135. The channel division method is carried out such that output data from the data latch circuit 134 are alternately latched by two latches 135a and 135b, based on the two-symbol clock signal, to be divided into data for a channel A and data for a channel B. For example, data of 1, 343, . . . become A-channel data, whereas 172, 514, . . . become B-channel data, as shown in FIG. 9.

On the other hand, the record formatter unit 140 record-formats channel data outputted from the interleave and channel division unit 130 through the record formatters 140a and 140b, respectively. Next, the operation of the record formatter unit 140 will be described.

Upon receiving a record start signal the memory initialization circuit 143 outputs a write enable signal, a previously stored address and dummy data, to the memory circuits 141 and 142. For example, formatting is carried out for respective data recorded on the video tape by record formatting of the record formatter unit 140 for respective channels according to the present invention, as shown in FIGS. 10A and 10B.

Figure 10A:
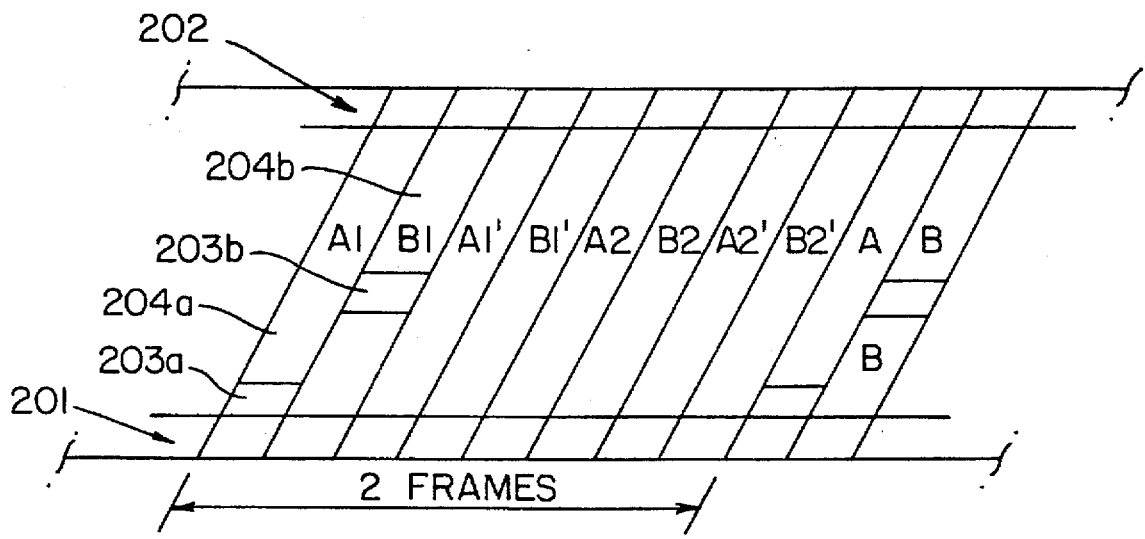
FIG. 10A is a schematic view illustrating a data format for each channel recorded on a video tape according to the present invention.
Figure 10B:
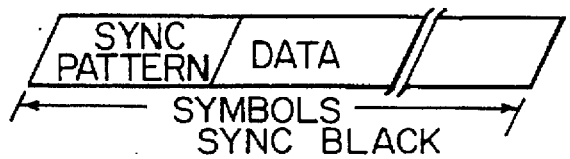
FIG. 10B is a schematic view illustrating a data format for a horizontal synchronizing block according to the present invention.

As shown in FIG. 10A, the start position and the end position of each of tracks A1, B1, A1', B1', A2 B2 A2' and B2' are added with dummy blocks 201 and 202 in a predetermined number, respectively. Also, they are added at their required positions with synchronizing blocks 203a and 203b, by channels, at intervals of every two frames. As a result, the memory circuits 141 and 142 are initialized. At this time, synchronizing patterns of a predetermined number (for example—4 symbols) are initialized at each start portion of the dummy blocks 201 and 202, the synchronizing blocks 203a and 203b and the horizontal synchronizing blocks 204a and 204b. That is, the data format for each horizontal synchronizing block according to the present invention uses the data format included in the original TV signal, without any modification, as shown in FIG. 10B. In other words, no additional synchronizing pattern or identification data for identifying positions of horizontal synchronizing blocks is added.

Herein, each of the dummy blocks 201 and 202 is a horizontal synchronizing block of a predetermined number which is added for preventing a generation of errors upon head switching. On the other hand, each of the synchronizing blocks 203a and 203b is a horizontal synchronizing block of a predetermined number which is added for making the proper number of horizontal synchronizing blocks per track. The reason why the synchronizing blocks 203a and 203b are added at intervals of two frames is that the HDTV signal includes 525 horizontal lines (525 horizontal synchronizing blocks) per frame. When data of such a HDTV signal are divided into channels A and B by selecting them alternately, data of one frame is started at the channel A and ended at channel A and data of another frame is started at channel B and ended at channel B. As a result, where the data division into the channels A and B is performed at intervals of every two frames, data is started at channel A and ended at channel B. Thus, a periodicity of data is provided. Symbols in a predetermined number are recorded, as frame-synchronizing pattern data, to data of the synchronizing blocks 203a and 203b. Upon playing-back, a frame identification is made at intervals of every two frames, based on the frame-synchronizing pattern data of the synchronizing blocks.

Each number of synchronizing blocks 203a and 203b is predetermined so that the sum of the number of dummy blocks 201 and 202, the number of horizontal synchronizing blocks 204a and 204b of information data, and the number of synchronizing blocks 203a and 203b is a multiple of 4, thereby making the number of horizontal synchronizing blocks per track to be constant. Also, the reason why the position of each synchronizing block 203a is different from the position of each synchronizing block 203b is that positions of the A-channel head versus the B-channel head are generally different from each other.

Since data is recorded on a video tape under the condition that it has been divided into two channels, high density data such as a HDTV signal can be recorded on a general S-VHS-tape. In particular, the quantity of data is not increased, since no additional synchronizing pattern or identification data is added to each horizontal synchronizing block. Although a slight increase in data quantity occurs due to the addition of dummy blocks and synchronizing blocks, this data quantity is very small as compared with the case of adding the additional synchronizing pattern and identification data to each horizontal synchronizing block as according to the prior art.

Now, operation of the playback system according to the present invention will be described.

When the VCR is operated in a playback mode, video signals recorded on the video tape are detected by channels by the record/playback head unit 170, amplified by the playback amplification unit 210 and then inputted at the data detection unit 220. The data detection unit 220 performs an equalizing operation for signals received thereto, a clock recovery operation and a data detection operation. Thereafter, the synchronous operation detection unit 230 detects the synchronizing pattern of each horizontal synchronizing block and thus detects synchronizing signals. In the demodulation unit 240, a demodulation corresponding to the modulation upon recording is achieved. At this time, the frame synchronizing pattern data of each of synchronizing blocks 203a and 203b is detected so that start positions with intervals of two frames are identified.

In the playback formatter unit 250, output data from the demodulation unit 240 are subjected, by channels, to a played-back data formatting for removing the dummy blocks and synchronizing blocks which were added upon recording. The playback formatting for each channel will be now described.

The control circuit 251 controls write and read operations of the memory circuits 255 and 256 alternately, at intervals of every four vertical synchronizing signals so as to alternately record data in the memory circuits 255 and 256 and alternately output data therefrom. Herein, the read operation can be achieved by incrementing the value of address, based on read clock signals, in that the read is achieved by reading all portions on which data has been written. However, the writing operation should be properly controlled, since the write is achieved for original information data blocks free of the dummy blocks and synchronizing blocks.

First, ones corresponding to positions of dummy blocks and synchronizing blocks from the horizontal synchronizing signals are muted in the effective synchronizing signal detection circuit 252, so as to detect effective synchronizing signals. The effective synchronizing signal detection circuit 252 counts the horizontal synchronizing signals by its counter 252b which receives every fourth vertical synchronizing signal as a clear signal and outputs a control signal for muting the horizontal synchronizing signals when the counted value from the counter 252b reaches a value predetermined to correspond to each position of dummy blocks and synchronizing blocks. Since the dummy blocks and synchronizing blocks are added at fixed positions at intervals of every two frames, upon recording, the positions of dummy blocks and synchronizing blocks can be found by counting the horizontal synchronizing signals generated for each horizontal synchronizing block. At this time, the playback formatter 250a for the A-channel and the playback formatter 250b for the B-channel perform different logic combination operations so as to find positions of synchronizing blocks corresponding to respective channels A and B, since the position of each synchronizing block for the A-channel is different from the position of each synchronizing block for the B-channel. Also, the logic circuit 253c is preset every time the counted value from the counter 252b has been cleared four times and outputs a control signal for muting the horizontal synchronizing signals corresponding to each position of the dummy blocks and the synchronizing blocks, in that the addition of the synchronizing blocks in a predetermined number has been achieved at intervals of every two frames. Based on the control signal, the OR gate 253d mutes ones corresponding to each position of the dummy blocks and the synchronizing blocks from the horizontal synchronizing signals, the timing of which have been accomplished by the delay 253a.

Thereafter, the effective synchronizing signals are applied as load signals to the counter 254d of the write address generation circuit 254 and as clock signals to the flip-flop array 254b via the delay 254a. The flip-flop array 254b outputs an output value from the adder 254c, inputted at its data input terminal, upon every receipt of the clock signal. The adder 254c is cleared at intervals of every two frames so that it adds a predetermined value to the output value from the flip-flop array 254b and applies the resultant value to the data input terminal of the flip-flop array 254b. As an effective horizontal synchronizing signal is applied as a load signal for the counter 254d, the counter 254d increments the counted value from the added value outputted from the flip-flop array 254b at intervals of every two clock signals and outputs the resultant value as a write address.

For example, after clearing the adder 254c, the flip-flop array 254b outputs the value present prior to the clearing of adder 254c as the value for the counter 254c, and receives an effective synchronizing signal under a condition that the zero value based on the clearing of adder 254c has been loaded as a data input, and the counter 254d carries out its counting operation from the value present prior to the clearing of adder 254c and increments the counted value from the former value.

On the other hand, when the effective synchronizing signal is applied as a clock signal for the flip-flop array 254b via the delay 254a, the zero value based on the clear of adder 254c is applied to the counter 254d. In this case, the adder 254c adds a value corresponding to the data value of one horizontal synchronizing block and loads the resultant value at the data input terminal of the flip-flop array 254b. Thereafter, as the next effective synchronizing signal is inputted, the counter 254d increments the counted value from the zero value. When the next effective synchronizing signal is applied to the density of two times, the maximum density of a number of data of one horizontal synchronizing block is loaded as the adding value at the counter 254d.

As a write address is generated in a manner as mentioned above, the memory circuits 255 and 256 carry out their write operations for information data free of dummy blocks and synchronizing blocks, at intervals of every two frames. Corresponding to the write operations, read operations are carried out. That is, no read operation is made when the dummy block and synchronizing block are present at the start position of each successive two-frames. When the dummy block and synchronizing block are present at the middle portion of each successive two-frames, they are removed, since the write address are generated in an overlapped manner.

Subsequently, the data which has been subjected, by channels, to the playback formatting in the playback formatter unit 250 are selected by channels in the de-interleave and channel combination unit 260 and simultaneously subjected to a de-interleave operation corresponding to the interleave operating upon recording. The data from the de-interleave operation and channel combination unit 260 are then error-corrected and decoded in the error-correction and decoding unit 270 and outputted as a played-back digital video signal via the interface unit 280.

As apparent from the above description, the present invention makes it possible to record signals with a data density two times the maxiumum density otherwise permitted in that data is recorded under the condition that it has been divided into two channels. Accordingly, HDTV signals can thus be recorded on S-VHS-tapes. In accordance with the present invention, dummy blocks are added to data upon recording, thereby enabling the generation of errors upon head-switching to be prevented. Thus, an improvement in picture quality can be obtained The number of blocks per track is constant by virtue of the addition of synchronizing blocks. Accordingly, there is the effect that positions of blocks can be correctly designated without the addition of any additional synchronizing pattern or identification data. Furthermore, it is possible to reduce the quantity of data for signal treatment. It is also possible to prevent a generation of error data portions from which no synchronizing pattern and identification data are detected, in that one horizontal synchronizing block is separately recorded on two tracks.

Since the number of horizontal synchronizing blocks for each channel is constant and dummy blocks are added to data portions at which head switching is made, it is possible to achieve a vertical synchronizing signal detection by using every fourth vertical synchronizing signal.

In accordance with the present invention, the number of blocks per track is constant and synchronizing patterns are added to synchronizing blocks. Accordingly, positions of horizontal synchronizing blocks can be designated by using the synchronizing patterns. This provides an effect of simplifying the circuit of the playback system in that no detection and reading of identification data are required upon playing-back. Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for the two-channel recording/playing back of High Definition Television (HDTV) signals having a wide bandwidth using a narrow bandwidth recording video tape with a digital video cassette recorder, said method comprising the steps of:

recording wide bandwidth data on a narrow bandwidth recording video tape in two channels, the recording step including the sub-steps of:

error correcting a received digital signal in a wide bandwidth so as to form error-corrected data;

interleaving said error-corrected data;

dividing the interleaved wide bandwidth data into two channels of narrow bandwidth data by alternately selecting said interleaved data so as to form two-channel data;

formatting the two-channels of narrow bandwidth data by adding dummy blocks at an end position of each track so as to prevent the generation of errors when head switching and adding synchronizing blocks at intervals of every two frames so as to make the number of blocks per track constant;

recording the formatted narrow bandwidth data on a narrow bandwidth video tape; and playing back the wide bandwidth data using the narrow bandwidth data recorded on the narrow bandwidth video tape recorded in two channels, the playing-back step including the sub-steps of:

demodulating two-channel narrow bandwidth data obtained from the narrow bandwidth video tape; and formatting the two-channel narrow bandwidth data by removing the dummy blocks and the synchronizing blocks from the two-channel data;

combining the formatted two-channel narrow bandwidth data into wide bandwidth data and de-interleaving the wide bandwidth data.

2. A method in accordance with claim 1, wherein the formatting sub-step is performed without the addition of an additional synchronizing pattern or identification data.

3. A method in accordance with claim 1, wherein each of the synchronizing blocks includes a synchronizing pattern adapted to identify each interval of two frames for each channel upon playing-back.

4. An apparatus for the two channel recording/playing back of High Definition Television signals having a wide bandwidth using a narrow bandwidth recording video tape with a digital video cassette recorder, comprising:

error-correction and encoding means for correcting errors of a HDTV digital video signal having a wide bandwidth inputted via interface means;

interleave and channel division means for interleaving an output signal from the error-correction and encoding means and dividing the wide bandwidth data into two channels;

record formatter means for formatting the two-channels of narrow bandwidth data by adding dummy blocks at an end position of each track so as to prevent the generation of error when head switching and adding synchronizing blocks at intervals of every two frames so as to make the number of blocks per track constant;

modulation means for modulating output narrow bandwidth data from the record formatter means by channels;

record amplification means for amplifying an output signal from the modulation means and outputting it at record/playback head means, by channels; and means for recording the narrow bandwidth on a narrow bandwidth videotape in a playback system for reproducing said recorded data.

5. An apparatus in accordance with claim 4, wherein the interleave and channel division means comprises:

a data storage circuit including a pair of memories for storing and outputting alternately, wide bandwidth data that is received symbol-by-symbol and outputted frame-by-frame;

address generation means, including a write address generator for generating a write address for writing data horizontally on the memory circuit based on a symbol clock signal and a read address generator for receiving the write address generated from the write address generator as an address and generating the write address previously stored at intervals of every two vertical synchronizing signals so as to read vertically the wide bandwidth data stored in the memory circuit;

address selection means including two pairs of latches for latching the write and read addresses, alternately, frame-by-frame and supplying the write and read addresses alternately to the memories of the memory circuit;

a data latch circuit including: a pair of first latches for latching alternately data received symbol-by-symbol and supplying said data to the memories as write data; and a pair of second latches for latching and outputting the data alternately outputted from the memories of the memory circuit, respectively;

channel division means including a pair of latches for latching, alternately, wide bandwidth data outputted from the memory circuit through the data latch circuit thereby dividing said wide bandwidth data into narrow bandwidth data for the two channels; and control means, including an address controller, for controlling the write and output operations of each memory of the memory circuit and correspondingly for controlling the address selection of the address election means and the enable state of each latch of the data latch circuit; and, a channel controller for controlling the enable states of latches of the channel division means, alternately, based on a two-symbol clock signal.

6. An apparatus in accordance with claim 4, wherein the record formatter means comprises:

memory initialization circuit means for outputting dummy data to be recorded as data for each dummy block and each synchronizing block, the positions of which are predetermined on each track, and address and write signals, based on a record start signal from the video cassette recorder;

memory circuit means for recording the dummy data outputted from the memory initialization circuit at predetermined positions, so as to be respectively initialized, for receiving data, and for storing and outputting said data, alternately;

write address generation circuit means for recording information data on memory locations of the memory circuits except for the dummy blocks and synchronizing blocks, at intervals of every four vertical synchronizing signals, according to a two-symbol clock signal;

read address generation circuit means for generating read addresses for the memory circuits at intervals of every four vertical synchronizing signals, according to a clock signal which is slightly faster than the two-symbol clock signal;

a pair of multiplexors for selecting the write and read addresses, alternately;

memory control circuit means for controlling write and read operations of the memory circuits, alternately, and for controlling the selecting of the multiplexors; and switching circuit means for supplying the write signal, address and dummy data from the memory initialization circuit means to the memory circuit means, upon the memory initialization according to a write control signal from the memory initialization circuit means and for supplying a write/read selection signal from the memory control circuit means, selected addresses from the multiplexors and input data from the interleave and channel division means to the memory circuits, after the memory initialization.

7. An apparatus in accordance with claim 4, wherein the playback system comprises:

playback amplification means for receiving played-back signals from narrow bandwidth data from a narrow bandwidth video tape detected by the record/playback head means, by channels, and amplifying them to a proper level;

data detection means for detecting data from an output signal from the playback amplification means, by channels;

synchronous detection means for detecting a synchronizing signal from an output signal from the data detection means;

demodulation means for demodulating the synchronizing signal-detected data from the synchronous detection means by channels;

playback formatter means for formatting the played-back data by channels, by removing the dummy blocks and synchronizing blocks added to each channel of narrow bandwidth data upon recording, from an output signal from the demodulation means;

de-interleave and channel combination means for de-interleaving two-channel narrow bandwidth data from the formatter means and combining the two-channel narrow bandwidth data into wide bandwidth data; and error-correction and decoding means for error-correcting output data from the de-interleave and channel combination means, decoding it into digital video data and outputting it via the interface means.

8. An apparatus in accordance with claim 7, wherein the playback formatter means comprises:

memory circuit means for recording data, alternately, at intervals of two frames;

control means for controlling write and read operations of the memory circuit means, alternately, at intervals of every four vertical synchronizing signals;

effective synchronizing signal detection means for muting horizontal synchronizing signals corresponding to positions of the dummy blocks and synchronizing blocks added upon recording, at intervals of every four vertical synchronizing signals and outputting the remaining horizontal synchronizing signals as effective synchronizing signals;

write address generation means for generating write addresses for recording actual information data, free of data about the dummy blocks and synchronizing blocks, in the memory circuits, based on the effective synchronizing signals from the effective synchronizing signal detection means;

read address generation circuit means for generating read addresses for the memory circuits; and data delay circuit means for delaying the input data so as to make the timing of the input data correspond to the timing of both the effective synchronizing signal detection means and the write address generation means and for supplying the input data to the memory circuits after the delay.

9. An apparatus in accordance with claim 8, wherein the write address generation means comprises:

a delay for delaying the effective synchronizing signal from the effective synchronizing signal detection means;

a flip-flop array for outputting a data value loaded at its data input terminal upon every receipt of the effective synchronizing signal through the delay;

an adder for adding a predetermined value based on the number of data in one horizontal line, to the output data value from the flip-flop array every time when the output value varies and loading the resultant value in a data input terminal of the flip-flop array; and a counter for incrementing the counted value from the output data value from the flip-flop array upon every receipt of the effective synchronizing signal and outputting the resultant value as a write address.

10. An apparatus in accordance with claim 7, wherein the means for detecting a synchronizing signal comprises:

a counter for counting horizontal synchronizing signals at intervals of every four vertical synchronizing signals;

a logic circuit for outputting a control signal for muting synchronizing signals when a counted value of the counter corresponds to each position of the dummy blocks and synchronizing blocks;

a delay for delaying each inputted horizontal synchronizing signal so as to make the timing of an output signal from the logic circuit correspond to the timing of the inputted horizontal synchronizing signal; and a logic gate for ORing an output signal from the delay and an output signal from the logic circuit and outputting the resultant value as an effective synchronizing signal.

* * * * *